US008861668B2

(12) United States Patent
Kamada

(10) Patent No.: US 8,861,668 B2
(45) Date of Patent: Oct. 14, 2014

(54) TRANSMISSION DEVICE, TRANSMISSION METHOD AND COMPUTER PROGRAM

(75) Inventor: Shinya Kamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/996,170

(22) PCT Filed: Nov. 29, 2011

(86) PCT No.: PCT/JP2011/077502
§ 371 (c)(1),
(2), (4) Date: Jun. 20, 2013

(87) PCT Pub. No.: WO2012/086372
PCT Pub. Date: Jun. 28, 2012

(65) Prior Publication Data
US 2013/0272352 A1     Oct. 17, 2013

(30) Foreign Application Priority Data
Dec. 24, 2010   (JP) ................................ 2010-286894

(51) Int. Cl.
*H04L 7/00* (2006.01)
*H04L 12/403* (2006.01)
*H04L 12/64* (2006.01)
*H04J 3/06* (2006.01)

(52) U.S. Cl.
CPC ............ *H04L 7/0008* (2013.01); *H04L 12/403* (2013.01); *H04L 12/6418* (2013.01); *H04J 3/0667* (2013.01)
USPC .......................................... 375/371; 375/355

(58) Field of Classification Search
CPC ....... H04J 3/065; H04J 3/0661; H04J 3/0667; H04J 3/0673; H04J 3/0682; H04L 7/0008; H04L 69/28
USPC .......................................... 375/354, 355, 371
See application file for complete search history.

(56) References Cited

U.S. PATENT DOCUMENTS

| 2008/0075128 A1* | 3/2008 | Fourcand ...................... 370/520 |
| 2010/0085990 A1* | 4/2010 | Belhadj et al. ................ 370/517 |
| 2013/0132554 A1* | 5/2013 | Armbruster ................... 709/223 |
| 2013/0202291 A1* | 8/2013 | Cavaliere et al. .............. 398/33 |

FOREIGN PATENT DOCUMENTS

| JP | 2001-177570 | 6/2001 |
| JP | 2005-253033 | 9/2005 |
| JP | 2010-062992 | 3/2010 |
| WO | 2010-104153 | 9/2010 |
| WO | 2011-074529 | 6/2011 |

OTHER PUBLICATIONS

International Search Report PCT/JP2011/077502 dated Jan. 24, 2012, with English translation.

* cited by examiner

*Primary Examiner* — David B. Lugo
(74) *Attorney, Agent, or Firm* — Young & Thompson

(57) ABSTRACT

Provided is a transmission device that transmits or receives synchronous data used to perform synchronization of a clock through a transmission path having a variable transmission band and includes a transmission band acquiring unit that acquires a current transmission band in the transmission path, a calculating unit that calculates a time necessary until the synchronous data is received after the synchronous data is transmitted through the transmission path based on the transmission band, and accumulates the calculated time and a staying time of the synchronous data in its own device as delay information recorded in the synchronous data, and a transmitting unit that writes a value of a result of accumulation by the calculating unit to the synchronous data as new delay information of the synchronous data, and transmits the synchronous data.

6 Claims, 9 Drawing Sheets

PRIOR ART

TRANSMISSION DEVICE, TRANSMISSION METHOD AND COMPUTER PROGRAM

TECHNICAL FIELD

The present invention relates to a technique of performing clock synchronization through a communication path.

BACKGROUND ART

Currently, an international standard such as IEEE 1588v2 has been established as a technique (see Patent Document 1) of performing clock synchronization using a packet network. In IEEE 1588v2, it is possible not only to synchronize the frequency of a clock but also to adjust a time or a phase of a clock. In IEEE 1588v2, a clock master device and a slave device to be synchronized with the master device are provided. Between the master device and the slave device, a delay time is measured by communication using a packet. Based on a measurement result of the delay time, synchronization of the frequency of a clock, time adjustment, and phase adjustment of a clock are implemented. For this reason, errors or fluctuations in the delay time affect the accuracy of clock reproduction of the slave device as is.

Most errors or fluctuations in the delay time are caused because a time until a clock synchronization packet is output after it is input to a packet transmission device is not constant. The fluctuations in the time occur due to control of quality of service (QoS) in a packet transmission device. Meanwhile, in IEEE 1588v2, a technique of correcting a delay time in a packet transmission device is defined. According to this technique, a packet transmission device conforming to IEEE 1588v2 can correct the errors in the delay time.

DOCUMENTS OF THE PRIOR ART

Patent Documents

[Patent Document 1] Japanese Unexamined Patent Application, First Application No. 2010-062992

DISCLOSURE OF INVENTION

Problem to be Solved by the Invention

However, the main purpose of the correcting technique is to correct the delay time in the packet transmission device. In addition to the error in the delay time in the packet transmission device, there are cases in which the delay time of the transmission path changes. Such cases are not considered in IEEE 1588v2. This is because when in general wired connection, the delay time of the transmission path does not significantly change.

In recent years, even in the mobile backhaul network, demands for performing clock synchronization using the technique specified in IEEE 1588v2 have increased. In the mobile backhaul network, the wireless transmission device is mostly used as the packet transmission device. The wireless transmission is performed in air space and thus likely to be affected by the environment such as rain and undergo line disconnection in the worst case. In this regard, there is a technique of reducing a wireless transmission band according to a status of a transmission path and securing connectivity.

When the transmission band of the wireless transmission path is reduced, a packet transmission time substantially increases, and thus a transmission delay consequently changes. As described above, in the clock synchronization technique specified in IEEE 1588v2, the error in the delay time directly leads to the clock accuracy.

Further, there is a technique of guaranteeing the delay error of the packet transmission device, but the case in which the delay time in the transmission path changes is not considered. For this reason, there is a problem in that as the transmission band in the wireless transmission path changes, the clock accuracy deteriorates temporarily at the time of change. This problem is not confined to the wireless transmission, and the same problem occurs even in wired transmission when a transmission path having a variable transmission band is used.

In light of the foregoing, the present invention is directed to providing a technique of performing clock synchronization through a transmission path having a variable transmission band with a high degree of accuracy.

Means for Solving the Problem

An aspect of the present invention provides a transmission device that transmits or receives synchronous data used to perform synchronization of a clock through a transmission path having a variable transmission band and includes a transmission band acquiring unit that acquires a current transmission band in the transmission path, a calculating unit that calculates a time necessary until the synchronous data is received after the synchronous data is transmitted through the transmission path based on the transmission band, and accumulates the calculated time and a staying time of the synchronous data in its own device as delay information recorded in the synchronous data, and a transmitting unit that writes a value of a result of accumulation by the calculating unit to the synchronous data as new delay information of the synchronous data, and transmits the synchronous data.

An aspect of the present invention provides a transmission method performed by a transmission device that transmits or receives synchronous data used to perform synchronization of a clock through a transmission path having a variable transmission band, and the transmission method includes acquiring a current transmission band in the transmission path, calculating a time necessary until the synchronous data is received after the synchronous data is transmitted through the transmission path based on the transmission band, and accumulating the calculated time and a staying time of the synchronous data in its own device as delay information recorded in the synchronous data, and writing a value of a result of accumulation by the calculating of the time to the synchronous data as new delay information of the synchronous data, and transmitting the synchronous data.

An aspect of the present invention provides a computer program causing an information processing device, which transmits or receives synchronous data used to perform synchronization of a clock through a transmission path having a variable transmission band, to execute: acquiring a current transmission band in the transmission path, calculating a time necessary until the synchronous data is received after the synchronous data is transmitted through the transmission path based on the transmission band, and accumulating the calculated time and a staying time of the synchronous data in its own device as delay information recorded in the synchronous data, and writing a value of a result of accumulation by the calculating of the time to the synchronous data as new delay information of the synchronous data, and transmitting the synchronous data.

Effect of the Invention

According to the present invention, it is possible to provide a technique of performing clock synchronization through a transmission path having a variable transmission band with a high degree of accuracy.

EMBODIMENTS FOR CARRYING OUT THE INVENTION

[IEEE1588]

Figure 1:
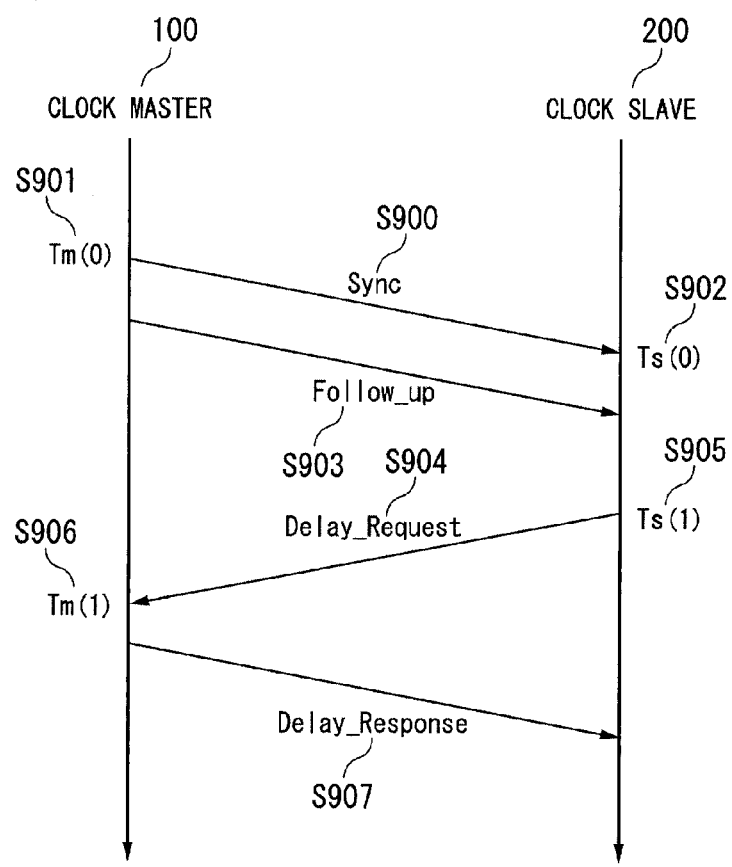
FIG. 1 is a sequence diagram illustrating a communication sequence in a time synchronization algorithm of IEEE1588.

First of all, a time synchronization algorithm of IEEE1588 will be described. FIG. 1 is a sequence diagram illustrating a communication sequence in a time synchronization algorithm of IEEE1588. Referring to FIG. 1, two-way communication is performed between a clock master 100 and a clock slave 200, and the clock slave 200 periodically synchronizes a time with the clock master 100.

The clock master 100 periodically transmits a Sync message to the clock slave 200 (step S900). The clock master 100 records a transmission time (hereinafter referred to as a "Sync transmission time") Tm (0) of the Sync message (step S901). Next, the clock master 100 transmits a Follow_up message to the clock slave 200 (step S903). At this time, the clock master 100 stores the Sync transmission time Tm (0) in the Follow_up message.

Upon receiving the Sync message, the clock slave 200 records a reception time (hereinafter referred to as a "Sync reception time") Ts (0) of the Sync message using the reception process as a trigger (step S902). Next, the clock slave 200 receives the Follow_up message, and extracts and records the Sync transmission time Tm (0) stored in the Follow_up message. Next, the clock slave 200 transmits a Delay_Request message to the clock master 100 (step S904). Then, the clock slave 200 records a transmission time (hereinafter referred to as a "Delay transmission time") Ts (1) of the Delay_Request message (step S905).

Upon receiving the Delay_Request message, the clock master 100 records a reception time (hereinafter referred to as a "Delay reception time") Tm (1) of the Delay_Request message using the reception process as a trigger (step S906). Next, the clock master 100 transmits a Delay_Response message to the clock slave 200 (step S907). At this time, the clock master 100 stores the Delay reception time Tm (1) in the Delay_Response message.

Upon receiving the Delay_Response message, the clock slave 200 extracts and records the Delay reception time Tm (1) stored in the Delay_Response message.

The clock slave 200 calculates a difference MS_Diff between a time (hereinafter referred to as a "master time") in the clock master 100 and a time (hereinafter referred to as a "slave time") in the clock slave 200 based on the Sync transmission time Tm (0) and the Sync reception time Ts (0) using the following Formula 1:

$$MS\_Diff = Ts(0) - Tm(0) = MS\_Delay + Offset \quad \text{Formula 1}$$

Further, the clock slave 200 obtains a difference between the slave time and the master time based on the Delay transmission time Ts (1) and the Delay reception time Tm (1) using the following Formula 2:

$$SM\_Diff = Tm(1) - Ts(1) = SM\_Delay - Offset \quad \text{Formula 2.}$$

Here, MS_Delay represents a transmission delay from the clock master 100 to the clock slave 200, SM_Delay represents a transmission delay from the clock slave 200 to the clock master 100, and Offset represents a time offset (leading) of the clock slave 200 on the clock master 100. The transmission delays MS_Delay and SM_Delay include a propagation delay between the clock master 100 and the clock slave 200 and a queuing delay occurring in a relay node on a network between the clock master 100 and the clock slave 200.

As described above, two Formulas, that is, Formulas 1 and 2, are obtained in connection with Offset which is the time deviation of the clock slave 200 with respect to the clock master 100. However, the two Formulas include unknown parameters such as MS_Delay and SM_Delay in addition to Offset. Thus, since only two Formulas are present for three unknown parameters, it is difficult to calculate Offset. For this reason, in IEEE1588, under the assumption that the transmission delay MS_Delay from the clock master 100 to the clock slave 200 is equal to the transmission delay SM_Delay from the clock slave 200 to the clock master 100, and all of the two values are Delay, Formulas 1 and 2 are converted into the following Formulas 3 and 4:

$$MS\_Diff = Delay + Offset \quad \text{Formula 3}$$

$$SM\_Diff = Delay - Offset \quad \text{Formula 4}$$

The following Formula 5 is derived by solving simultaneous equations of Formulas 3 and 4:

$$Offset = (MS\_Diff - SM\_Diff)/2 \quad \text{Formula 5}$$

The clock slave 200 synchronizes the slave time with the master time by calculating Offset using Formula 5 and correcting the slave time based on Offset. The foregoing is the time synchronization algorithm specified in IEEE1588.

[IEEE1588v2]

Figure 2A:
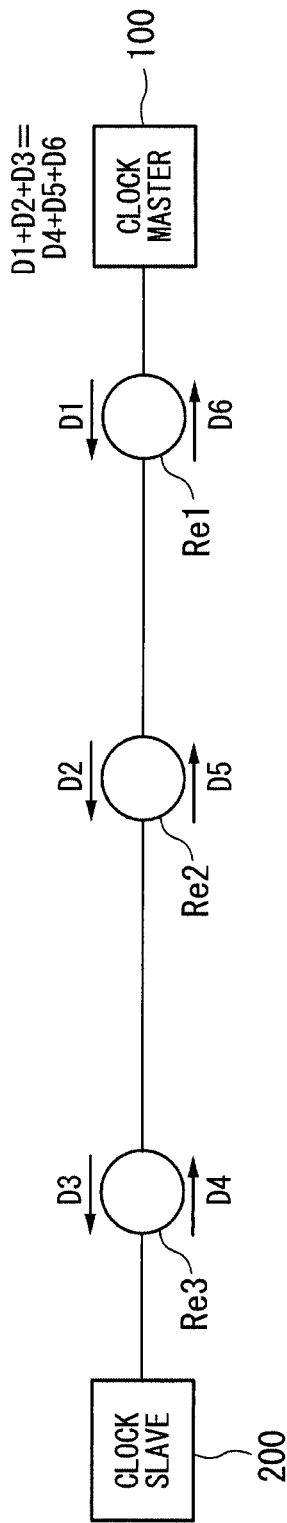
FIG. 2A is a schematic diagram illustrating an outline of time synchronization algorithms specified in IEEE1588 and IEEE1588v2.
Figure 2B:
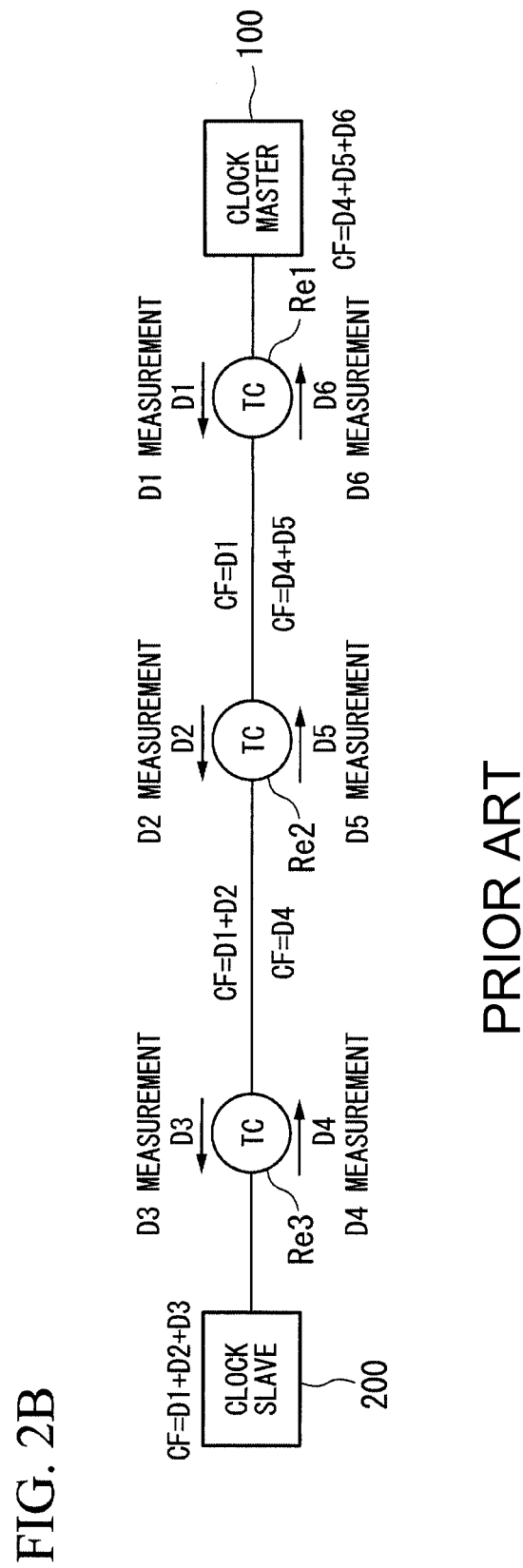
FIG. 2B is a schematic diagram illustrating an outline of time synchronization algorithms specified in IEEE1588 and IEEE1588v2.

Next, the time synchronization algorithm specified in IEEE1588v2 will be described. FIG. 2 is a schematic diagram illustrating an outline of the time synchronization algorithms specified in IEEE1588 and IEEE1588v2. FIG. 2A illustrates an outline of the time synchronization algorithm specified in IEEE1588. FIG. 2B illustrates an output line of the time synchronization algorithm specified in IEEE1588v2. In FIGS. 2A and 2B, D1 to D6 represent queuing delays that occur in relay nodes Re1 to Re3, respectively, in transmission in an arrow direction.

In IEEE1588v2, each of the relay nodes Re1 to Re3 has a TC function. The TC function is a function of measuring a staying time (intra-device delay information) during which a control message (an IEEE1588 message) packet stays in a node and writing the time in a predetermined field of the control packet while accumulatively adding the time. Specifically, the IEEE1588 message refers to the Sync message and the Delay_Request message. In IEEE1588v2, the staying times of the relay nodes Re1 to Re3 are accumulatively added in the message through the TC function each time the control packet passes through the relay nodes Re1 to Re3. Thus, the clock slave 200 can accurately acquire the sum of the queuing delays occurring at the relay nodes Re1 to Re3 in transmission from the clock master 100 to the clock slave 200. Similarly, the clock master 100 can accurately acquire the sum of the queuing delays occurring at the relay nodes Re1 to Re3 in transmission from the clock slave 200 to the clock master 100.

When the sum of the queuing delays and the propagation delay in transmission from the clock master 100 to the clock slave 200 are referred to as MS_Q and MS_P, respectively, and the sum of the queuing delays and the propagation delay in transmission from the clock slave 200 to the clock master 100 are referred to SM_Q and SM_P, respectively, Formulas 1 and 2 can be converted into the following Formulas 6 and 7, respectively:

$$MS\_Diff = MS\_P + MS\_Q + \text{Offset} \quad \text{Formula 6}$$

$$SM\_Diff = SM\_P + SM\_Q - \text{Offset} \quad \text{Formula 7}$$

Here, when a message transmission path in transmission from the clock master 100 to the clock slave 200 is equal to a message transmission path in transmission from the clock slave 200 to the clock master 100 in both directions, MS_P=SM_P=Propagation_Delay is established. In this case, Formulas 6 and 7 can be converted into the following Formulas 8 and 9, respectively:

$$MS\_Diff = \text{Propagation\_Delay} + MS\_Q + \text{Offset} \quad \text{Formula 8}$$

$$SM\_Diff = \text{Propagation\_Delay} + SM\_Q - \text{Offset} \quad \text{Formula 9}$$

Then, the following Formula 10 can be obtained from Formulas 8 and 9 as a formula for calculating Offset.

$$\text{Offset} = \{(MS\_Diff - SM\_Diff) - (MS\_Q - SM\_Q)\}/2 \quad \text{Formula 10}$$

As illustrated in FIG. 2A, in IEEE1588 (hereinafter, also referred to as "Pure IEEE1588") rather than IEEE1588v2, the sum of the queuing delays occurring at the relay nodes Re1 to Re3 is assumed to be equal in a two-way direction. In other words, the sum (D1+D2+D3) of the queuing delays in transmission from the clock master 100 to the clock slave 200 is assumed to be equal to the sum (D4+D5+D6) of the queuing delays in transmission from the clock slave 200 to the clock master 100. However, since the two are not equal in practice, the accuracy of synchronization is deteriorated by the error.

On the other hand, in IEEE1588v2, the sum of the queuing delays of the relay nodes Re1 to Re3 is measured by the TC functions implemented in the relay nodes Re1 to Re3. Further, the clock slave 200 accurately acquires the sum value (D1+D2+D3) of the queuing delays in transmission from the clock master 100 to the clock slave 200. Further, the clock master 100 accurately acquires the sum value (D4+D5+D6) of the queuing delays in transmission from the clock slave 200 to the clock master 100. Through this operation, in IEEE1588v2, time synchronization can be implemented with a high degree of accuracy. The time synchronization algorithm specified in IEEE1588v2 is as above.

Figure 3:
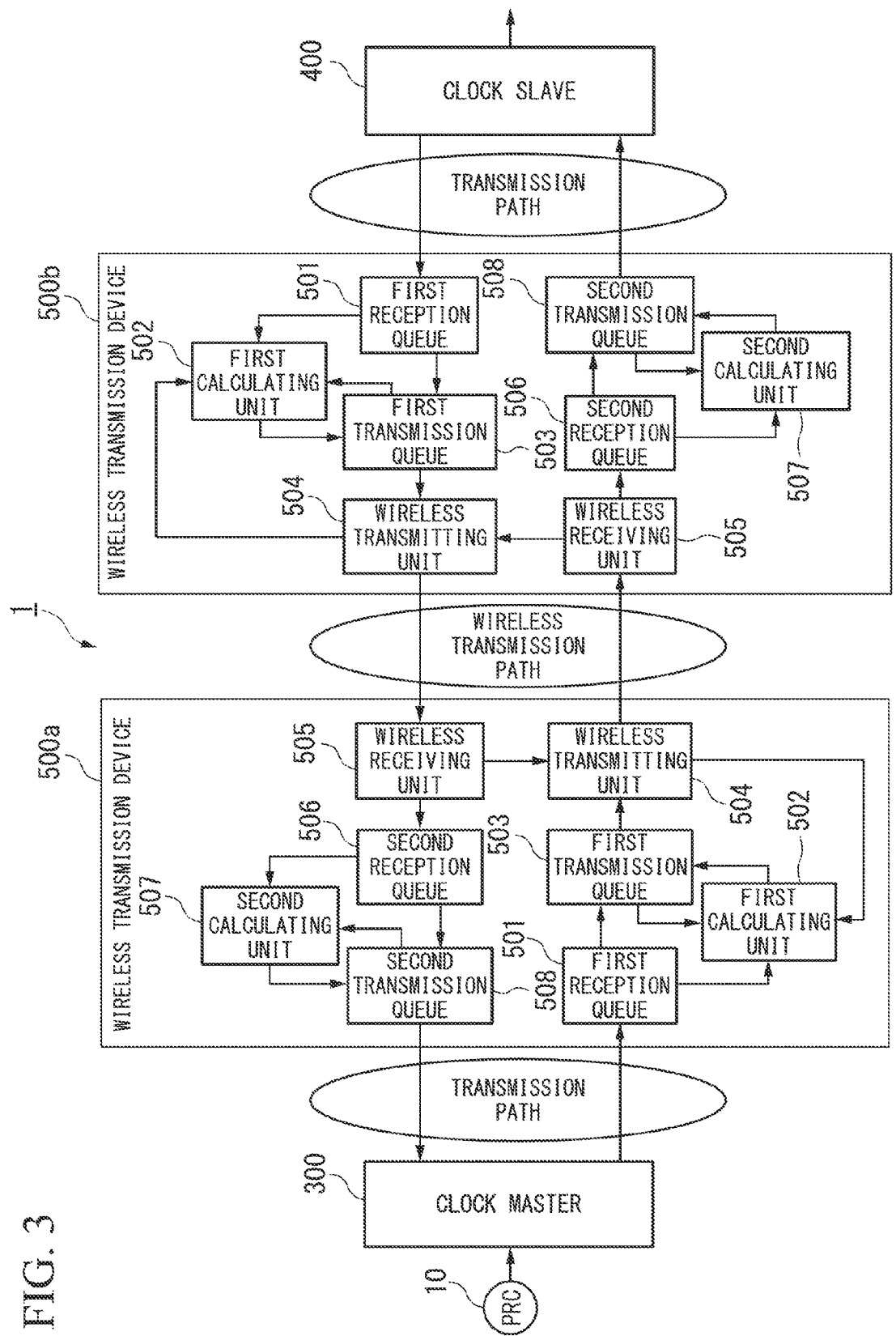
FIG. 3 is a system configuration diagram of a communication system according to an embodiment of the present invention.

FIG. 3 is a system configuration diagram of a communication system 1 according to an embodiment of the present invention. The communication system 1 includes a primary reference clock (PRC) 10, a clock master 300, a clock slave 400, a wireless transmission device 500a, and a wireless transmission device 500b. The communication system 1 operates according to IEEE 1588v2. The clock master 300 is connected to perform communication with the wireless transmission device 500a via a transmission path. The clock slave 400 is connected to perform communication with the wireless transmission device 500b via a transmission path. The wireless transmission device 500a and the wireless transmission device 500b perform wireless communication through a wireless transmission path.

The PRC 10 is a device designed according to a standard recommendation such as ITU-T G.811, and outputs accurate clock information. The Global Positioning System (GPS) may be used as the PRC 10. The clock master 300 acquires clock information from the PRC 10.

The clock slave 400 transmits or receives a synchronization packet (a control packet) to or from the clock master 300 through the wireless transmission device 500a and the wireless transmission device 500b. As the synchronization packet is transmitted or received, the clock slave 400 measures a delay time, reproduces clock information, and outputs a clock. The clock master 300 and the clock slave 400 correct the delay time based on the intra-device delay information (the intra-node stating time) included in the synchronization packet. As described above, the synchronization packet is used as synchronous data. Further, the intra-device delay information is used as delay information.

Next, the wireless transmission device 500a will be described. Since the wireless transmission device 500a and the wireless transmission device 500b basically have the same configuration, the wireless transmission device 500b will not be described below. The wireless transmission device 500a includes a central processing unit (CPU), a memory, an auxiliary storage device, and the like which are connected via a bus, and executes a transmission program. As the transmission program is executed, the wireless transmission device 500a functions as a device including a first reception queue 501, a first calculating unit 502, a first transmission queue 503, a wireless transmitting unit 504, a wireless receiving unit 505, a second reception queue 506, a second calculating unit 507, and a second transmission queue 508. All or some of the functions of the wireless transmission device 500a may be implemented using hardware such as an application specific integrated circuit (ASIC), a programmable logic device (PLD), or a field programmable gate array (FPGA). The transmission program may be recorded in a computer readable recording medium. Examples of the computer readable recording medium include a portable medium such as a flexible disk, a magnetic optical disc, a read only memory (ROM), a compact disc read only memory (CD-ROM) or a storage device such as a hard disk built in a computer system. The transmission program may be recorded in a recording medium, and read and executed by a computer. The transmission program may be transmitted through an electric telecommunication line.

The first reception queue 501 receives packets through the transmission path. The first reception queue 501 selects a synchronization packet from the received packets. When the synchronization packet is received, the first reception queue 501 notifies the first calculating unit 502 of a reception time Tr and an intra-device delay information Td included in the synchronization packet. Further, the first reception queue 501 transfers the received packet to the first transmission queue 503.

The first calculating unit 502 calculates intra-device delay time change information Tn based on the reception time Tr and the intra-device delay information Td notified from the first reception queue 501, a transmission time Tt notified from the first transmission queue 503, and radio band information BW notified from the wireless transmitting unit 504. The first calculating unit 502 notifies the first transmission queue 503 of the calculated intra-device delay time change information Tn. As described above, the first calculating unit 502 has a function of at least a calculating unit.

The first transmission queue 503 receives packets from the first reception queue 501, and transfers the packets to the wireless transmitting unit 504 in order. Upon receiving the synchronization packet from the first reception queue 501, the first transmission queue 503 notifies the first calculating unit 502 of the time Tt at which the synchronization packet is transmitted. Then, the first transmission queue 503 changes the intra-device delay information of the synchronization packet to the intra-device delay time change information Tn notified from the first calculating unit 502. As described above, the first transmission queue 503 has a function of at least a transmitting unit.

The wireless transmitting unit 504 converts the packet received from the first transmission queue 503 into a radio frame, performs an encoding process and a modulation process, and transmits a resultant radio frame to the wireless transmission path. The wireless transmitting unit 504 acquires the radio band information BW of the wireless transmission path, and notifies the calculating unit 502 of the acquired radio band information BW. As described above, the wireless transmitting unit 504 has a function of at least a transmission band acquiring unit. The radio band information BW represents a transmission band (a communication rate) in a wireless transmission path from its own station (its own device) to an opposite station (an opposite device). The opposite station refers to a device that acts as a counterpart of wireless communication performed through the wireless transmission path. For example, for the wireless transmitting unit 504 included in the wireless transmission device 500*a*, the wireless transmission device 500*a* is its own station, and the wireless transmission device 500*b* is the opposite station. A method of acquiring the radio band information BW through the wireless transmitting unit 504 is not particularly limited. An example of a method of acquiring the radio band information BW will be described below.

The wireless transmission device 500*a* and the wireless transmission device 500*b* perform wireless communication according to an adaptive modulation scheme. The wireless transmitting unit 504 of the wireless transmission device 500*a* (its own station) is notified of a modulation scheme from the wireless transmission device 500*b*. Further, the wireless transmitting unit 504 performs wireless transmission according to the notified modulation scheme, and calculates the transmission band (the radio band information BW) when transmission is performed according to the modulation scheme.

The above process will be described in further detail. The wireless receiving unit 505 of the wireless transmission device 500*b* (opposite station) acquires information representing a transmission path status in the wireless transmission path from the wireless transmission device 500*a* to the wireless transmission device 500*b* based on a reception level of a received signal and a decoding process result. The wireless receiving unit 505 decides the modulation scheme used by the wireless transmitting unit 504 of the wireless transmission device 500*a* based on the acquired information. The wireless receiving unit 505 notifies the wireless transmitting unit 504 of the same device (the wireless transmission device 500*b*) of information representing the decided modulation scheme. The wireless transmitting unit 504 transmits the information representing the notified modulation scheme to the wireless transmission device 500*a* through the wireless transmission path. Upon receiving the information representing the modulation scheme from the wireless transmission device 500*b*, the wireless receiving unit 505 of the wireless transmission device 500*a* notifies the wireless transmitting unit 504 of the modulation scheme. As a result, the wireless transmitting unit 504 of the wireless transmission device 500*a* (its own station) is notified of the modulation scheme from the wireless transmission device 500*b* (opposite station).

The configuration of the wireless transmission device 500*a* will be continuously described. The wireless receiving unit 505 receives the radio frame through the wireless transmission path. The wireless receiving unit 505 performs a demodulation process and a decoding process on the received radio frame, and reproduces packets. Then, the wireless receiving unit 505 transfers the reproduced packets to the second reception queue 506.

The second reception queue 506 receives the packets from the wireless receiving unit 505. The second reception queue 506 selects the synchronization packet from the received packets. When the synchronization packet is received, the second reception queue 506 notifies the second calculating unit 507 of the reception time Tr and the intra-device delay information Td included in the synchronization packet. The second reception queue 506 transfers the received packet to the second transmission queue 508.

The second calculating unit 507 calculates intra-device delay time change information Tn' based on the reception time Tr and the intra-device delay information Td notified from the second reception queue 506 and the transmission time Tt notified from the second transmission queue 508. The second calculating unit 507 notifies the second transmission queue 508 of the calculated intra-device delay time change information Tn'.

The second transmission queue 508 receives the packets from the second reception queue 506 and transmits the packets to a device of a transmission destination in order through the transmission path. Upon receiving the synchronization packet from the second reception queue 506, the second transmission queue 508 notifies the second calculating unit 507 of the time Tf at which the synchronization packet is transmitted. Then, the second transmission queue 508 changes the intra-device delay information of the synchronization packet to the intra-device delay time change information Tn' notified from the second calculating unit 507.

Figure 4:
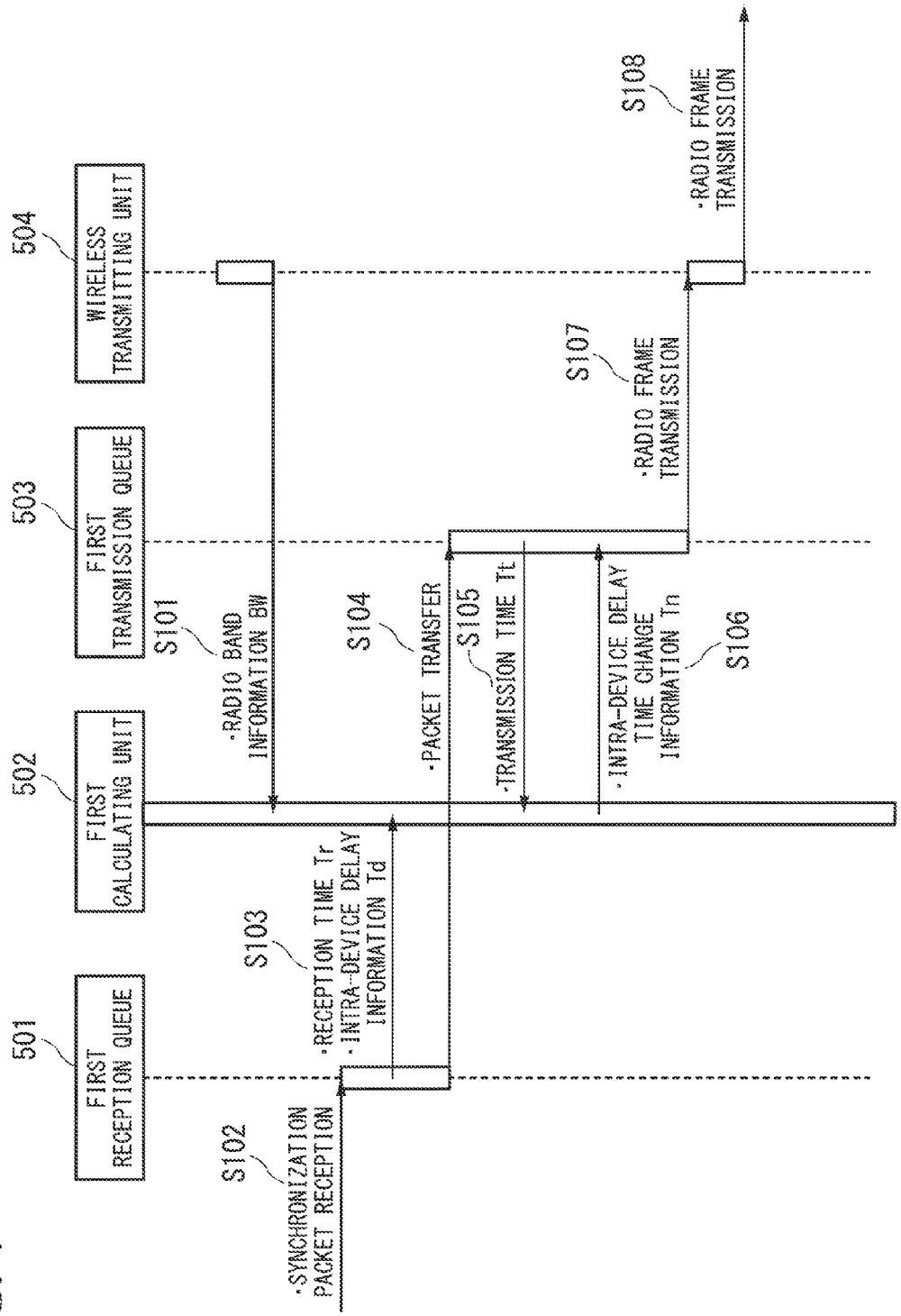
FIG. 4 is a sequence diagram illustrating the flow of a process in which a wireless transmission device illustrated in FIG. 3 transmits a synchronization packet to a wireless transmission path (a transmission path having a variable transmission band).

Next, the flow of an operation of the wireless transmission device 500*a* will be described. FIG. 4 is a sequence diagram illustrating the flow of a process in which the wireless transmission device 500*a* transmits the synchronization packet to the wireless transmission path (the transmission path having a variable transmission band). The wireless transmitting unit 504 notifies the first calculating unit 502 of the radio band information BW at a predetermined timing (step S101). The predetermined timing may be each time the wireless transmitting unit 504 acquires the radio band information BW, each time the value of the acquired radio band information BW changes, or any other timing.

When the synchronization packet is transmitted from the clock master 300 to the transmission path, first of all, the first reception queue 501 receives the synchronization packet (step S102). Next, the first reception queue 501 notifies the first calculating unit 502 of the reception time Tr at which the synchronization packet is received and the intra-device delay information Td included in the synchronization packet (step S103). Next, the first reception queue 501 transfers the synchronization packet to the first transmission queue 503 (step S104). Next, when it becomes possible to transmit the synchronization packet, the first transmission queue 503 notifies the first calculating unit 502 of the transmission time Tt (step S105). Next, the first calculating unit 502 calculates the intra-device delay time change information Tn based on the following Formula 11:

$$Tn = Td + Tt - Tr + Size/BW \qquad \text{Formula 11}$$

In Formula 11, "Size" represents the size of the synchronization packet (the size of synchronous data). A value of "Tt−Tr" represents a staying time of the synchronization packet in its own device. A value of Size is set to a value according to the type of synchronization packet handled by the communication system 1 and set to the first calculating unit 502 in advance. The first calculating unit 502 notifies the first transmission queue 503 of the intra-device delay time change information Tn (step S106).

Next, the first transmission queue 503 changes the intra-device delay time Td of the synchronization packet to the intra-device delay time change information Tn, and transfers the changed synchronization packet to the wireless transmitting unit 504 (step S107). The wireless transmitting unit 504 converts the received synchronization packet into a radio frame, and transmits the radio frame to the wireless transmission device 500b through the wireless transmission path (step S108).

The sequence diagram of FIG. 4 illustrates processing when the synchronization packet is received, but in processing when a packet other than the synchronization packet is received, an operation of only steps S102, S104, S107, and S108 is performed.

Figure 5:
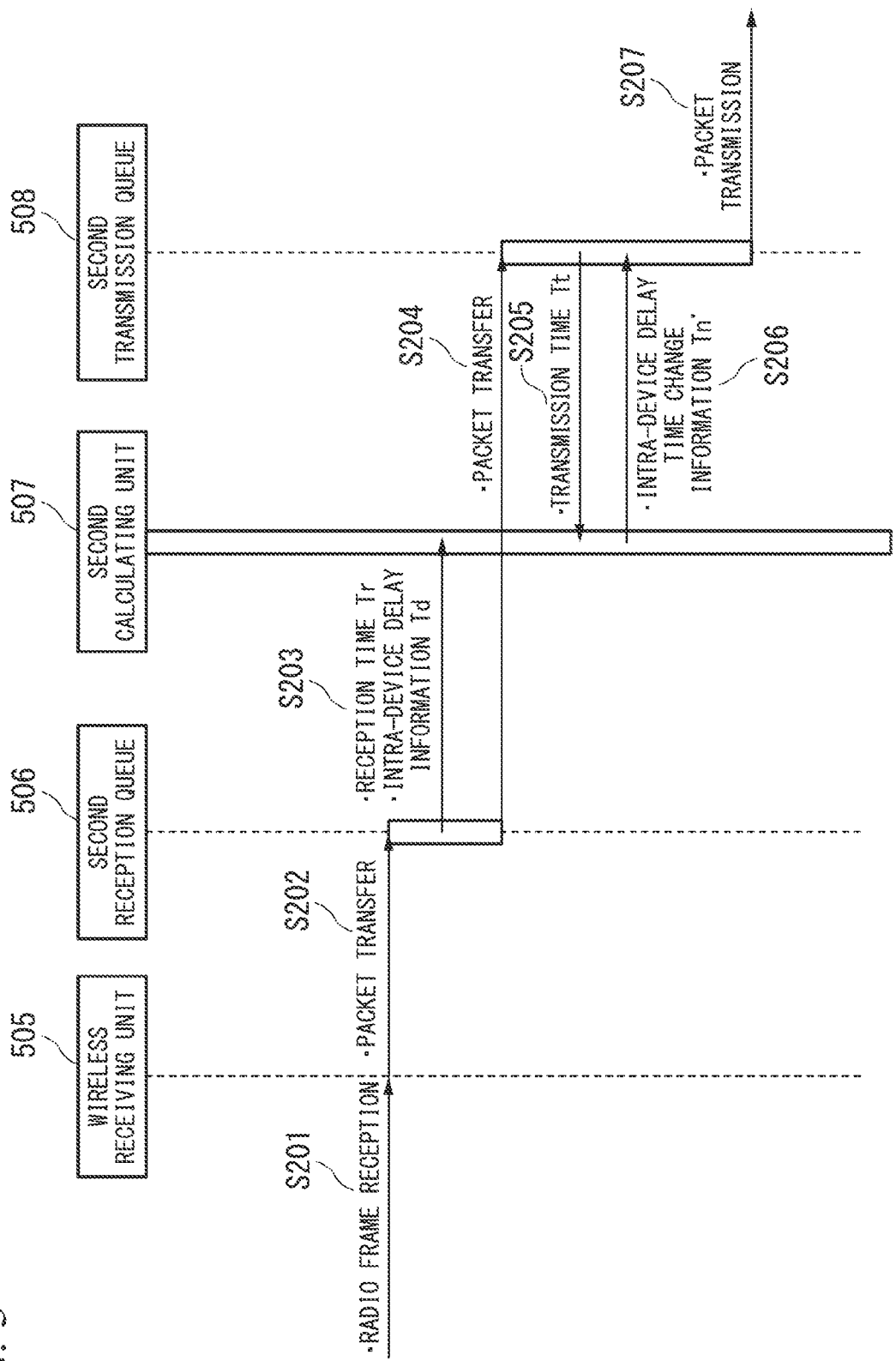
FIG. 5 is a sequence diagram illustrating the flow of a process in which the wireless transmission device illustrated in FIG. 3 transmits a synchronization packet to a transmission path (a transmission path whose transmission band does not change or a transmission path in which a change in a transmission band is not reflected in intra-device delay information).

FIG. 5 is a sequence diagram illustrating the flow of a process in which the wireless transmission device 500a transmits the synchronization packet to the transmission path (the transmission path whose transmission band does not change or the transmission path in which a change in the transmission band is not reflected in the intra-device delay information). When the synchronization packet is transmitted from the wireless transmission device 500b to the wireless transmission path, first of all, the wireless receiving unit 505 receives the synchronization packet (step S201). Then, the wireless receiving unit 505 transfers the received synchronization packet to the second reception queue 506 (step S202). Next, the second reception queue 506 notifies the second calculating unit 507 of the reception time Tr at which the synchronization packet is received and the intra-device delay information Td included in the synchronization packet (step S203). Next, the second reception queue 506 transfers the synchronization packet to the second transmission queue 508 (step S204). Next, when it becomes possible to transmit the synchronization packet, the second transmission queue 508 notifies the second calculating unit 507 of the transmission time Tt (step S205). Next, the second calculating unit 502 calculates the intra-device delay time change information Tn' based on the following Formula 12.

$$Tn' = Td + Tt - Tr \qquad \text{Formula 12}$$

The second calculating unit 507 notifies the second transmission queue 508 of the intra-device delay time change information Tn' (step S206). Next, the second transmission queue 508 changes the intra-device delay time Td of the synchronization packet to the intra-device delay time change information Tn'. Then, the second transmission queue 508 transmits the changed synchronization packet to the clock master 300 through the transmission path (step S207).

The sequence diagram of FIG. 5 illustrates processing when the synchronization packet is received, but in processing when a packet other than the synchronization packet is received, an operation of only steps S201, S202, S204, and S207 is performed.

In the communication system 1 having the above-described configuration, the intra-device delay time change information Tn according to the transmission band in the wireless transmission path is calculated, and the calculated value is set as the intra-device delay information of the synchronization packet. More specifically, when Tn is calculated, a value of "Size/BW" is added. This value represents a time necessary to transmit the synchronization packet from the wireless transmission device 500a to the wireless transmission device 500b in the current wireless transmission path. The value of BW is dynamically changed by the wireless transmitting unit 504. Thus, the intra-device delay time can be corrected according to the status of the wireless transmission path. As a result, even when the transmission band changes according to the status of the wireless transmission path, the clock synchronization using the synchronization packet can be performed with a high degree of accuracy.

MODIFIED EXAMPLE

Figure 6:
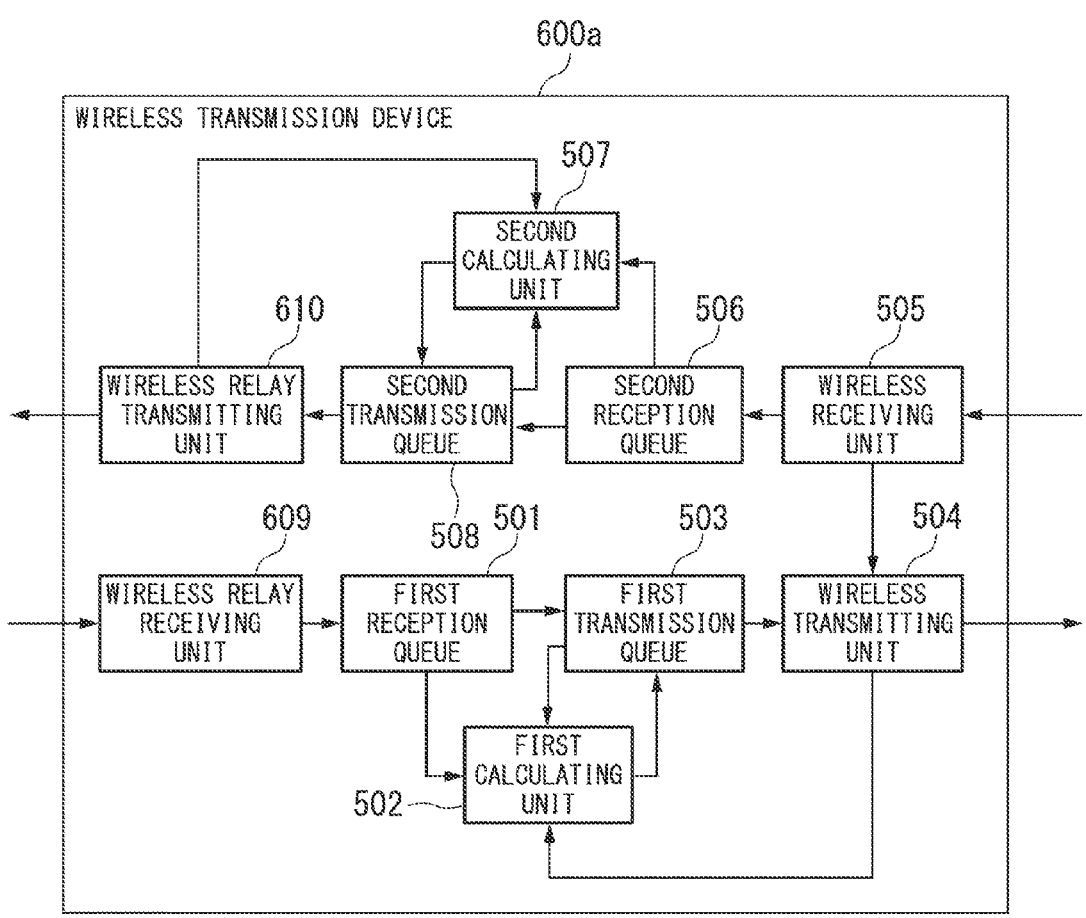
FIG. 6 is a functional block diagram illustrating a configuration of a first modified example of a wireless transmission device according to an embodiment of the present invention.

Next, a modified example of the wireless transmission device will be described. FIG. 6 is a functional block diagram illustrating a configuration of a first modified example (a wireless transmission device 600a). The wireless transmission device 600a differs from the wireless transmission device 500a in that a wireless relay receiving unit 609 and a wireless relay transmitting unit 610 are additionally provided.

One terminal of the wireless transmission device 500a is connected to the wireless transmission path, and the other terminal thereof is connected to a wired transmission path. On the other hand, both terminals of the wireless transmission device 600a are connected to the wireless transmission path.

In this case, the clock master 300 and the wireless transmission device 600a may perform communication via the wireless transmission path. Using the wireless transmission device 600a having the above-described configuration, the same effects as in the communication system 1 are obtained even in the wireless network without intervention of the wired network.

Further, the wireless transmission device 600a may be provided between the wireless transmission device 500a and the wireless transmission device 500b to relay communication between the wireless transmission device 500a and the wireless transmission device 500b.

Figure 7:
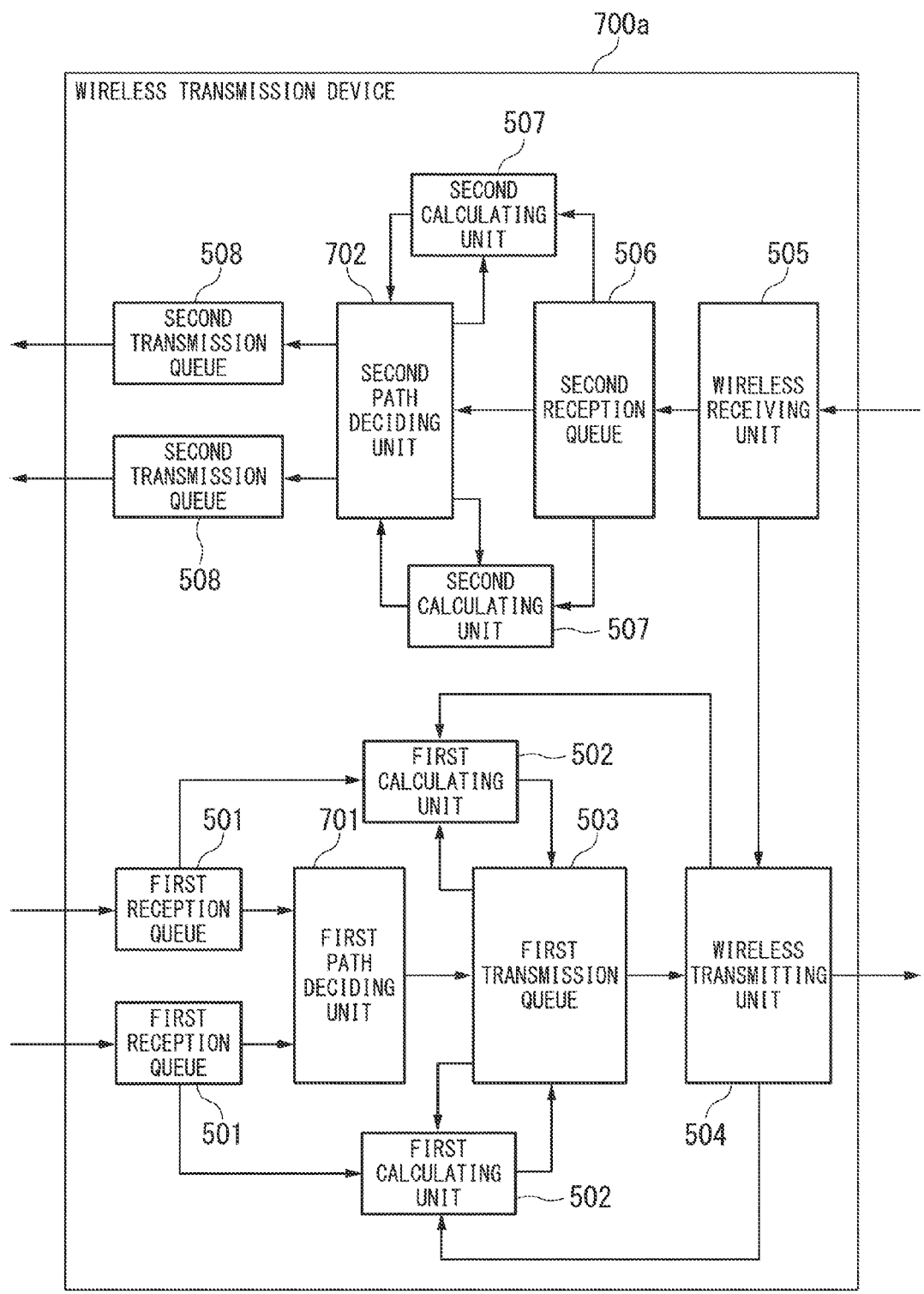
FIG. 7 is a functional block diagram illustrating a configuration of a second modified example of a wireless transmission device according to an embodiment of the present invention.

FIG. 7 is a functional block diagram illustrating a configuration of a second modified example (a wireless transmission device 700a).

The wireless transmission device 700a differs from the wireless transmission device 500a in that a plurality of first reception queues 501, a plurality of second transmission queues 508, a first path deciding unit 701, and a second path deciding unit 702 are provided. The first path deciding unit 701 stores a routing table, and decides a next transfer destination of a received packet according to a destination address of the received packet. The first path deciding unit 701 writes the decided transfer destination to a header of the packet, and transfers the packet to the first transmission queue 503. The second path deciding unit 702 stores a routing table, and decides a next transfer destination of a received packet according to a destination address of the received packet. The second path deciding unit 702 writes the decided transfer destination to a header of the packet, and transfers the packet to the second transmission queue 508. Using the wireless transmission device 700a having the above-described configuration, the same processing as in the communication system 1 can be performed even on the synchronization packets input from the different clock masters 300 through a plurality of transmission paths. Thus, the same effects as in the communication system 1 can be obtained even in the system in which the synchronization packets are transmitted from the different clock masters 300 through a plurality of transmission paths.

Figure 8:
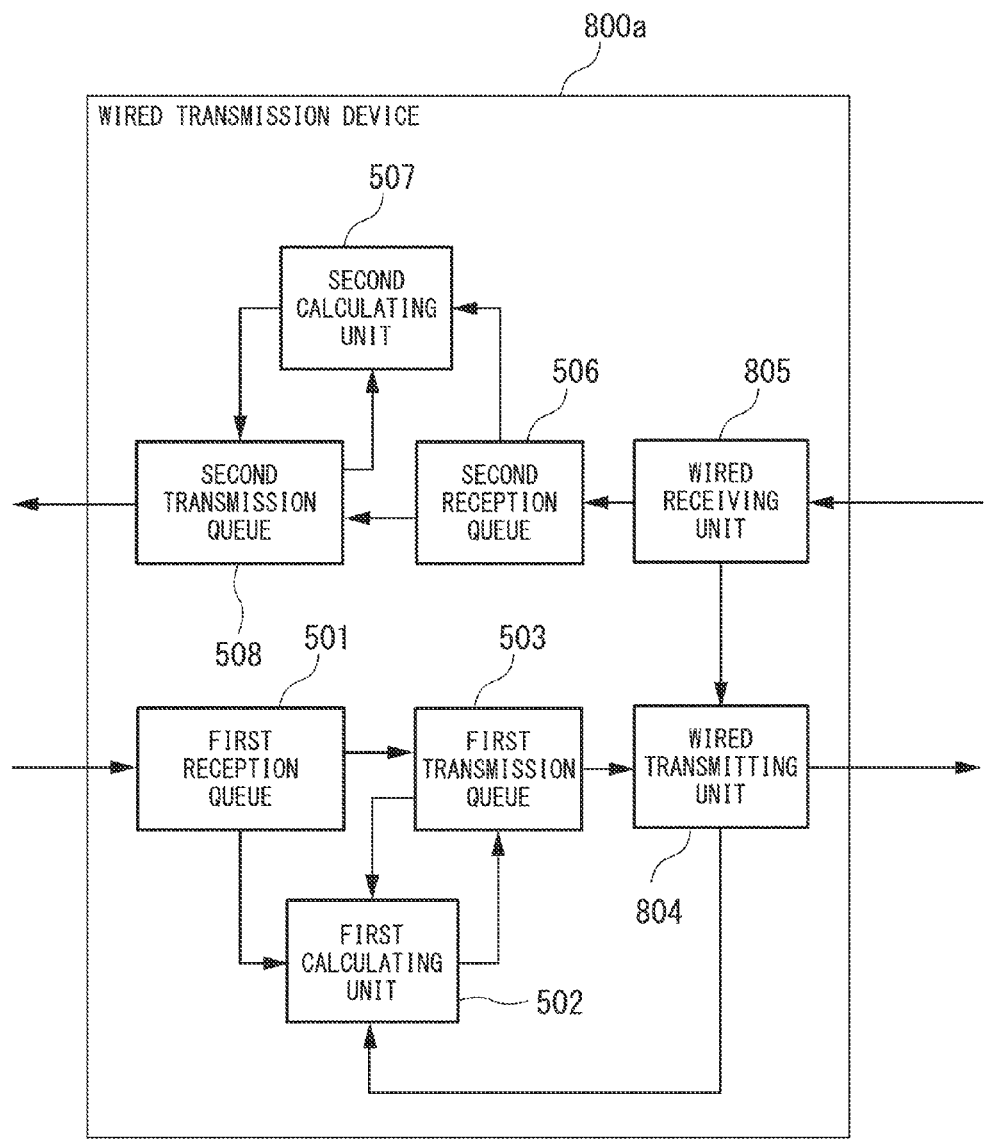
FIG. 8 is a functional block diagram illustrating a configuration of a third modified example of a wireless transmission device according to an embodiment of the present invention.

FIG. 8 is a functional block diagram illustrating a configuration of a third modified example (a wired transmission device 800a).

The wired transmission device 800a differs from the wireless transmission device 500a in that a wired transmitting unit 804 is provided instead of the wireless transmitting unit 504, and a wired receiving unit 805 is provided instead of the wireless receiving unit 505. The wired transmitting unit 804 differs from the wireless transmitting unit 504 only in whether a communication scheme is a wireless scheme or a wired scheme, and the remaining configuration thereof is similar to that of the wireless transmitting unit 504. In other words, the wired transmitting unit 804 converts a packet received from the first transmission queue 503 into a form conforming to a wired transmission path positioned between its own device and the wireless transmission device 500b, and transmits the converted packet. Further, the wired transmitting unit 804 acquires a transmission band according to the status of the wired transmission path positioned between its own device and the wireless transmission device 500b, and notifies the first calculating unit 502 of the transmission band. The concrete examples of the wired transmission path include a synchronous optical network/synchronous digital hierarchy (SONET/SDH) and an asymmetric digital subscriber line (ADSL). As described above, as long as a transmission path has a transmission band that changes and can be acquired by a transmission side device, the transmission path is not limited to a certain scheme.

The wired receiving unit 805 differs from the wireless receiving unit 505 only in whether a communication scheme is a wireless scheme or a wired scheme, and the remaining process thereof is similar to that of the wireless receiving unit 505. In other words, the wired receiving unit 805 receives a signal from the wired transmission path positioned between its own device and the wireless transmission device 500b, and restores the packet. Further, the wired receiving unit 805 transfers the recovered packet to the second reception queue 506.

In the wireless transmission device 500a in the first to third modified examples, the first calculating unit 502 and the second calculating unit 507 may be configured using a single operation circuit.

The first calculating unit 502 may acquire a time necessary to transmit the synchronization packet from the wireless transmission device 500a to the wireless transmission device 500b in the current wireless transmission path based on the operation method other than "Size/BW."

The embodiments of the invention have been described above in detail with reference to the accompanying drawings, but the concrete configuration is not limited to the above embodiment, and a design of a range not departing from the gist of the invention is also included Priority is claimed on Japanese Patent Application No. 2010-286894, filed Dec. 24, 2010, the contents of which are incorporated herein by reference.

INDUSTRIAL APPLICABILITY

The present invention can be applied to a system or a device that performs clock synchronization through a communication path.

REFERENCE SYMBOLS

1: communication system
10: PRC
300: clock master
400: clock slave
500a, 500b: wireless transmission device
501: first reception queue
502: first calculating unit (calculating unit)
503: first transmission queue (transmitting unit)
504: wireless transmitting unit (transmission band acquiring unit)
505: wireless receiving unit
506: second reception queue
507: second calculating unit
508: second transmission queue
609: wireless relay receiving unit
610: wireless relay transmitting unit
701: first path deciding unit
702: second path deciding unit
804: wired transmitting unit
805: wired receiving unit

The invention claimed is:

1. A transmission device that transmits or receives synchronous data used to perform synchronization of a clock through a transmission path having a variable transmission band, comprising:
   a transmission band acquiring unit that acquires a current transmission band in the transmission path;
   a calculating unit that calculates a time necessary until the synchronous data is received after the synchronous data is transmitted through the transmission path based on the transmission band, and accumulates the calculated time and a staying time of the synchronous data in its own device as delay information recorded in the synchronous data; and
   a transmitting unit that writes a value of a result of accumulation by the calculating unit to the synchronous data as new delay information of the synchronous data, and transmits the synchronous data.

2. The transmission device according to claim 1,
   wherein the calculating unit stores a size of the synchronous data in advance, and calculates a time necessary until the synchronous data is received after the synchronous data is transmitted through the transmission path by dividing the size by the transmission band.

3. The transmission device according to claim 2,
   wherein the transmission band acquiring unit acquires communication information related to communication from its own device to an opposite device which is a communication counter part of its own device from the opposite device, and acquires the transmission band based on the communication information.

4. The transmission device according to claim 1,
wherein the transmission band acquiring unit acquires communication information related to communication from its own device to an opposite device which is a communication counter part of its own device from the opposite device, and acquires the transmission band based on the communication information.

5. A transmission method performed by a transmission device that transmits or receives synchronous data used to perform synchronization of a clock through a transmission path having a variable transmission band, the transmission method comprising:
 acquiring a current transmission band in the transmission path;
 calculating a time necessary until the synchronous data is received after the synchronous data is transmitted through the transmission path based on the transmission band, and accumulating the calculated time and a staying time of the synchronous data in its own device as delay information recorded in the synchronous data; and
 writing a value of a result of accumulation by the calculating of the time to the synchronous data as new delay information of the synchronous data, and transmitting the synchronous data.

6. A non-transitory computer-readable recording medium in which a computer program is recorded, the computer program causing an information processing device, which transmits or receives synchronous data used to perform synchronization of a clock through a transmission path having a variable transmission band, to execute:
 acquiring a current transmission band in the transmission path;
 calculating a time necessary until the synchronous data is received after the synchronous data is transmitted through the transmission path based on the transmission band, and accumulating the calculated time and a staying time of the synchronous data in its own device as delay information recorded in the synchronous data; and
 including a value of a result of accumulation by the calculating of the time in the synchronous data as new delay information of the synchronous data, and transmitting the synchronous data.

* * * * *